E. E. KLUIN.
TRAP.
APPLICATION FILED APR. 25, 1916.
1,197,377.
Patented Sept. 5, 1916.
Fig. 1.
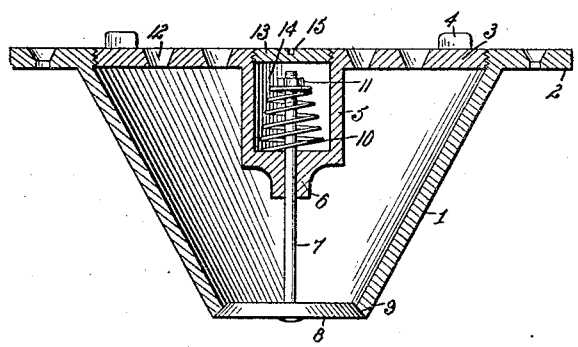
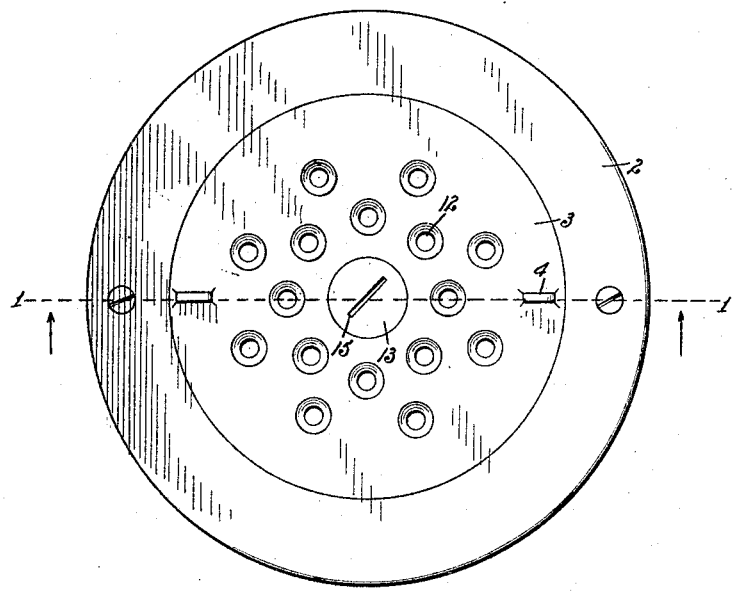
Fig. 2.
WITNESSES
INVENTOR
Eilt E. Kluin
BY
ATTORNEYS

UNITED STATES PATENT OFFICE.

EILT E. KLUIN, OF ELIZABETH, NEW JERSEY.

TRAP.

1,197,377.  Specification of Letters Patent.  Patented Sept. 5, 1916.

Application filed April 25, 1916. Serial No. 93,495.

*To all whom it may concern:*

Be it known that I, EILT E. KLUIN, a citizen of the United States, and a resident of Elizabeth, in the county of Union and State of New Jersey, have invented a new and Improved Trap, of which the following is a full, clear, and exact description.

This invention relates to traps and particularly to an improved sewer trap which is normally maintained closed but which will readily open when a predetermined quantity of liquid has been deposited therein.

The object in view is to provide an improved arrangement wherein a valve member is utilized for closing the trap until a certain quantity of liquid has accumulated.

Another object in view is to provide a valve member and a resilient support therefor together with an adjustable member which may adjust the tension of the resilient support and thereby allow for accumulation of various quantities of liquid as may be desired under different circumstances.

In the accompanying drawings:—Figure 1 is a longitudinal vertical section through a trap embodying the invention, the same being taken approximately on line 1—1 of Fig. 2. Fig. 2 is a top plan view of the trap shown in Fig. 1.

Referring to the accompanying drawing by numerals, 1 indicates a frusto-conical shaped body provided with a flange 2 which may be provided with openings for receiving retaining screws or other means as desired. Interiorly the flange 2 is provided with threads for receiving a threaded cap 3, which cap is provided with upstanding lugs 4 for receiving a bolt of any kind, whereby the cap may be screwed into position or may be unscrewed whenever desired. Cap 3 is provided with a depending portion 5 formed hollow and merging into a guiding stem 6 for guiding the rod 7, which rod has a valve 8 rigidly connected thereto normally engaging the valve seat 9 on the cone member 1. A spring 10 surrounds the upper part of the rod 7 and bears against the nut 11 which is threaded on to the rod, thus allowing the tension of the spring to be varied as occasion may demand.

The cap 3 is provided with a plurality of openings or perforations 12 through which water or other liquid matter is adapted to pass, but said water or liquid matter cannot escape from the body 1 until a sufficient quantity has accumulated for overcoming the tension of spring 10, in which instance valve 8 will open and allow the fluid to pass into the sewer pipe and will then again close. In this way obnoxious gases or back flow of water will be prevented.

In order to protect the spring 10 so that the same will always work properly a plug 13 is threaded in the upper part of the chamber 14 in which the spring 10 is mounted, said plug being provided with any suitable means for receiving a tool, as for instance, a kerf 15.

In operation, when it is desired to use a trap constructed according to the invention the parts are arranged as shown in Fig. 1 and then applied to a sewer pipe in the usual or any preferred way. The nut 11 is then adjusted so that the spring 10 will be under any desired tension, as for instance, a tension for supporting two ounces of liquid. If it is desired to support more than that quantity or less, the nut 10 is correspondingly adjusted and when adjusted the device is in proper condition for use. If at any time the valve 8 should not close properly nut 10 may be adjusted for bringing the spring under more tension and thereby causing a quicker and better closing of the valve.

What I claim is:

In a trap of the character described, a body, a valve member for closing the lower end of the body, a supporting rod connected with said valve member and extending upwardly into the body, said rod having a threaded upper end, a cap closing the upper end of said body, said cap being perforated, said cap being also formed with a depending central portion provided with a bore, said rod extending into said bore, a spring in said bore surrounding said rod, a nut arranged on the threaded portion of said rod for varying the tension of said spring, and a plug for normally closing said bore so as to protect said spring and associated parts.

E. KLUIN.

Witnesses:
AUGUST WOLFERT,
JOHN ABEL.

Copies of this patent may be obtained for five cents each, by addressing the "Commissioner of Patents, Washington, D. C."